United States Patent
Hendry

(10) Patent No.: US 12,177,487 B2
(45) Date of Patent: Dec. 24, 2024

(54) IMAGE DECODING METHOD AND DEVICE

(71) Applicant: LG Electronics Inc., Seoul (KR)

(72) Inventor: Hendry Hendry, Seoul (KR)

(73) Assignee: LG Electronics Inc., Seoul (KR)

( * ) Notice: Subject to any disclaimer, the term of this patent is extended or adjusted under 35 U.S.C. 154(b) by 142 days.

(21) Appl. No.: 17/778,264

(22) PCT Filed: Dec. 29, 2020

(86) PCT No.: PCT/KR2020/019320
§ 371 (c)(1),
(2) Date: May 19, 2022

(87) PCT Pub. No.: WO2021/137589
PCT Pub. Date: Jul. 8, 2021

(65) Prior Publication Data
US 2022/0408115 A1 Dec. 22, 2022

Related U.S. Application Data

(60) Provisional application No. 62/955,362, filed on Dec. 30, 2019.

(51) Int. Cl.
*H04N 19/70* (2014.01)
*H04N 19/172* (2014.01)
*H04N 19/30* (2014.01)
*H04N 19/423* (2014.01)

(52) U.S. Cl.
CPC .......... *H04N 19/70* (2014.11); *H04N 19/172* (2014.11); *H04N 19/30* (2014.11); *H04N 19/423* (2014.11)

(58) Field of Classification Search
None
See application file for complete search history.

(56) References Cited

U.S. PATENT DOCUMENTS

| 10,448,040 | B2 | 10/2019 | Deshpande | |
|---|---|---|---|---|
| 2015/0103884 | A1* | 4/2015 | Ramasubramonian | H04N 19/423 375/240.25 |
| 2019/0007692 | A1 | 1/2019 | Deshpande | |

FOREIGN PATENT DOCUMENTS

| KR | 20080079669 | 9/2008 |
|---|---|---|
| KR | 101904625 | 10/2018 |

OTHER PUBLICATIONS

Bross et al., "Versatile Video Coding (Draft 7)," JVET-2001-vE, Presented at Joint Video Experts Team (JVET) of ITU-T SG 16 WP 3 and ISO/IEC JTC 1/SC 29/WG 11, 16th Meeting: Geneva, CH, Oct. 1-11, 2019, 489 pages (Year: 2019).*

Bross et al., "Versatile Video Coding (Draft 7)," JVET-P2001-vE, Presented at Joint Video Experts Team (JVET) of ITU-T SG 16 WP 3 and ISO/IEC JTC 1/SC 29/WG 11, 16th Meeting: Geneva, CH, Oct. 1-11, 2019, 489 pages.

* cited by examiner

*Primary Examiner* — Stuart D Bennett
(74) *Attorney, Agent, or Firm* — Fish & Richardson P.C.

(57) ABSTRACT

An image decoding method performed by a decoding device according to the present document comprises the steps of: obtaining image information; and updating a decoded picture buffer (DPB) on the basis of the image information, wherein the step of obtaining the image information comprises the steps of: obtaining an output layer set (OLS) DPB parameter index for a target OLS; and obtaining DPB parameter information relating to the target OLS on the basis of the OLS DPB parameter index.

7 Claims, 11 Drawing Sheets

IMAGE DECODING METHOD AND DEVICE

CROSS-REFERENCE TO RELATED APPLICATIONS

This application is a National Stage application under 35 U.S.C. § 371 of International Application No. PCT/KR2020/019320, filed on Dec. 29, 2020, which claims the benefit of U.S. Provisional Application No. 62/955,362, filed on Dec. 30, 2019. The disclosures of the prior applications are hereby incorporated by reference herein in their entirety.

BACKGROUND OF DISCLOSURE

Field of the Disclosure

This document relates to image coding technology, and more particularly, to an image decoding method for coding image information including DPB parameters mapped to OLS in an image coding system, and an apparatus therefor.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

The present disclosure provides a method and apparatus for improving image coding efficiency.

The present disclosure is also to provide a method and apparatus for deriving a decoded picture buffer (DPB) parameter for an output layer set (OLS).

According to an embodiment of this document, an image decoding method performed by a decoding apparatus is provided. The method includes obtaining image information, and updating a decoded picture buffer (DPB) based on the image information, wherein the obtaining the image information includes obtaining an output layer set (OLS) DPB parameter index for a target OLS, and obtaining DPB parameter information for the target OLS based on the OLS DPB parameter index.

According to another embodiment of this document, a decoding apparatus for performing image decoding is provided. The decoding apparatus includes an entropy decoder configured to obtain image information, and a DPB configured to update a decoded picture buffer (DPB) based on the image information, wherein the entropy encoder obtains an OLS DPB parameter index for a target output layer set (OLS), and obtains DPB parameter information for the target OLS based on the OLS DPB parameter index.

According to still another embodiment of this document, a video encoding method which is performed by an encoding apparatus is provided. The method includes updating a decoded picture buffer (DPB), and encoding image information, wherein the encoding the image information includes encoding DPB parameter information for output layer sets (OLSs), and encoding an OLS DPB parameter index for DPB parameter information for a target OLS among the DPB parameter information for the OLSs.

According to still another embodiment of this document, a video encoding apparatus is provided. The encoding apparatus includes a DPB configured to update a decoded picture buffer (DPB), and an entropy encoder configured to encode image information, wherein the entropy encoder encodes DPB parameter information for output layer sets (OLSs), and encodes an OLS DPB parameter index for DPB parameter information for a target OLS among the DPB parameter information for the OLSs.

According to still another embodiment of this document, there is provided a computer-readable digital storage medium that stores a bitstream including image information, which causes a decoding apparatus to perform an image decoding method. In the computer-readable digital storage medium, the image decoding method includes obtaining image information, and updating a decoded picture buffer (DPB) based on the image information, wherein the obtaining the image information includes obtaining an output layer set (OLS) DPB parameter index for a target OLS, and obtaining DPB parameter information for the target OLS based on the OLS DPB parameter index.

According to this document, DPB parameters for OLS can be signaled, and through this, DPB can be updated adaptively to OLS, and overall coding efficiency can be improved.

According to this document, index information indicating DPB parameters for OLS can be signaled, and through this, DPB parameters can be derived adaptively to OLS, and the overall coding efficiency can be improved by updating the DPB for OLS based on the derived DPB parameter.

DESCRIPTION OF EMBODIMENTS

Figure 1:
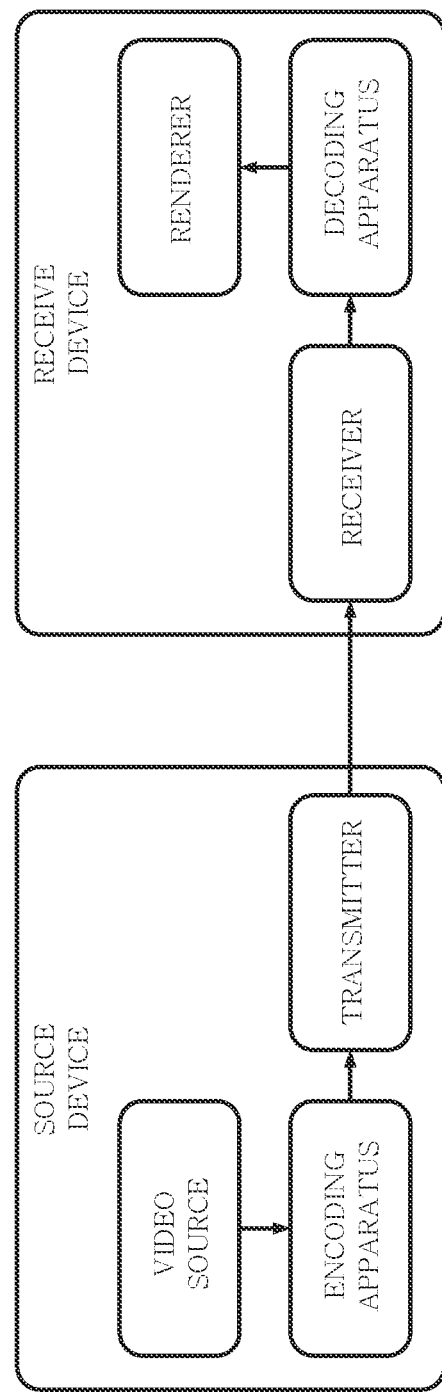
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. Also, a subpicture may represent a rectangular region of one or more slices within a picture. That is, a subpicture may contain one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consists of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present disclosure, "A or B" may mean "only A", "only B" or "both A and B". In other words, in the present disclosure, "A or B" may be interpreted as "A and/or B". For example, in the present disclosure, "A, B or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A, B and C" may mean "only A", "only B", "only C", or "any combination of A, B and C". Also, "at least one of A, B or C" or "at least one of A, B and/or C" may mean "at least one of A, B and C".

In addition, parentheses used in the present disclosure may mean "for example". Specifically, when "prediction (intra prediction)" is indicated, "intra prediction" may be proposed as an example of "prediction". In other words, "prediction" in the present disclosure may be not limited to "intra prediction", and "intra prediction" may be proposed as an example of "prediction". Also, even when "prediction (i.e., intra prediction)" is indicated, "intra prediction" may be proposed as an example of "prediction".

Technical features that are individually described in one drawing in the present disclosure may be implemented individually or may be implemented at the same time.

The following drawings were created to explain a specific example of the present disclosure. Since the names of specific devices described in the drawings or the names of specific signals/messages/fields are presented as an example, the technical features of the present disclosure are not limited to the specific names used in the following drawings.

Figure 2:
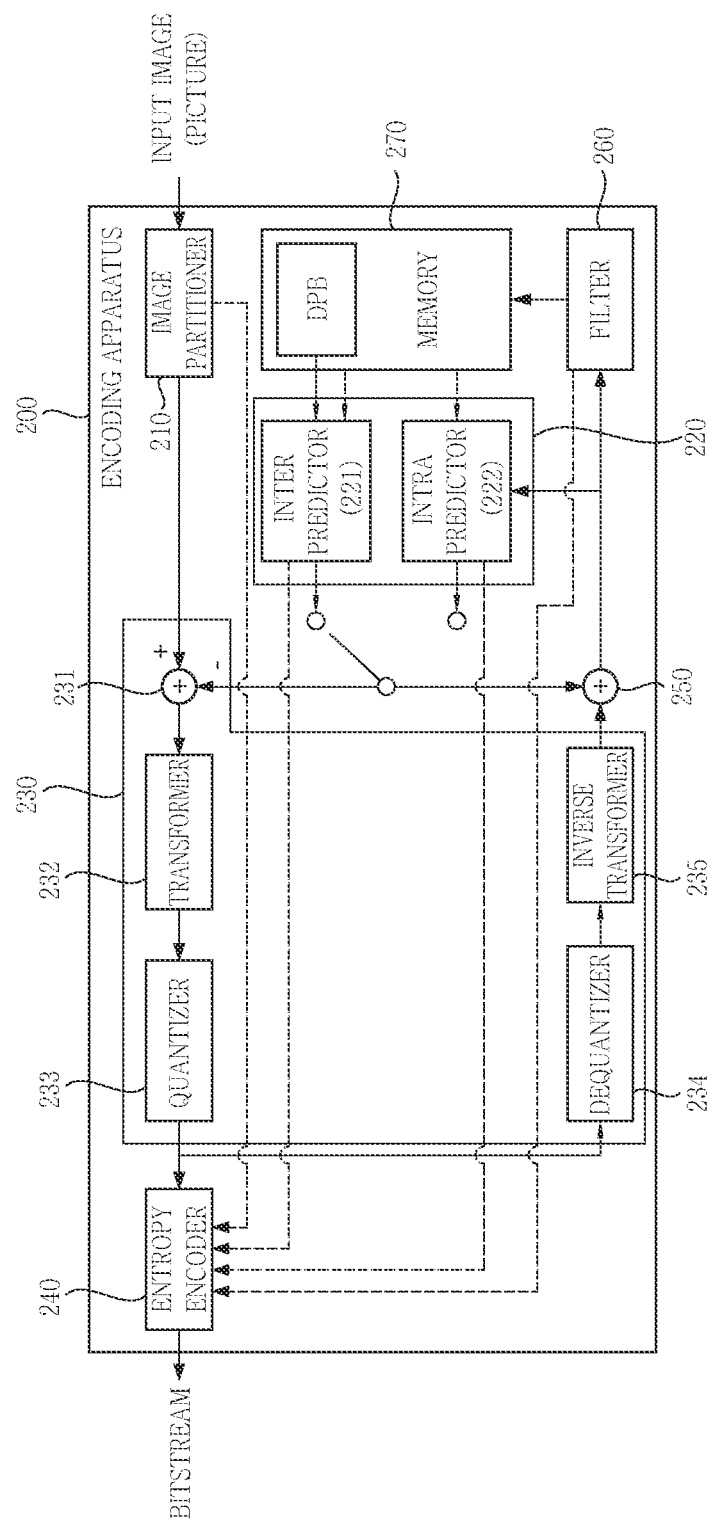
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
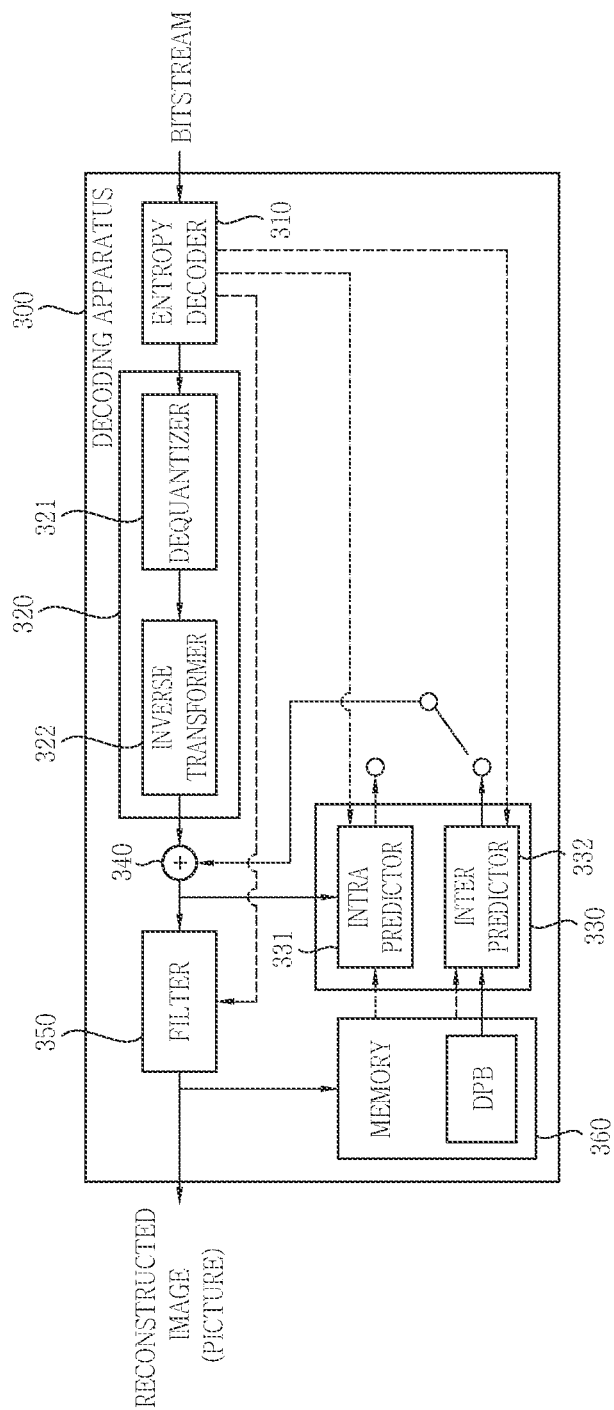
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

In the present disclosure, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficient may be called a coefficient or a residual coefficient, or may still be called a transform coefficient for uniformity of expression.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. The transform coefficients may be derived based on the residual information (or information on the transform coefficient(s)), and scaled transform coefficients may be derived through inverse transform (scaling) on the transform coefficients. Residual samples may be derived based on an inverse transform (transform) on the scaled transform coefficients. This may be applied/expressed in other parts of the present disclosure as well.

As described above, the encoding apparatus may perform various encoding methods such as exponential Golomb, context-adaptive variable length coding (CAVLC), and context-adaptive binary arithmetic coding (CABAC). In addition, the decoding apparatus may decode information in a bitstream based on a coding method such as exponential Golomb coding, CAVLC or CABAC, and output a value of a syntax element required for image reconstruction and quantized values of transform coefficients related to residuals.

For example, the coding methods described above may be performed as described below.

Figure 4:
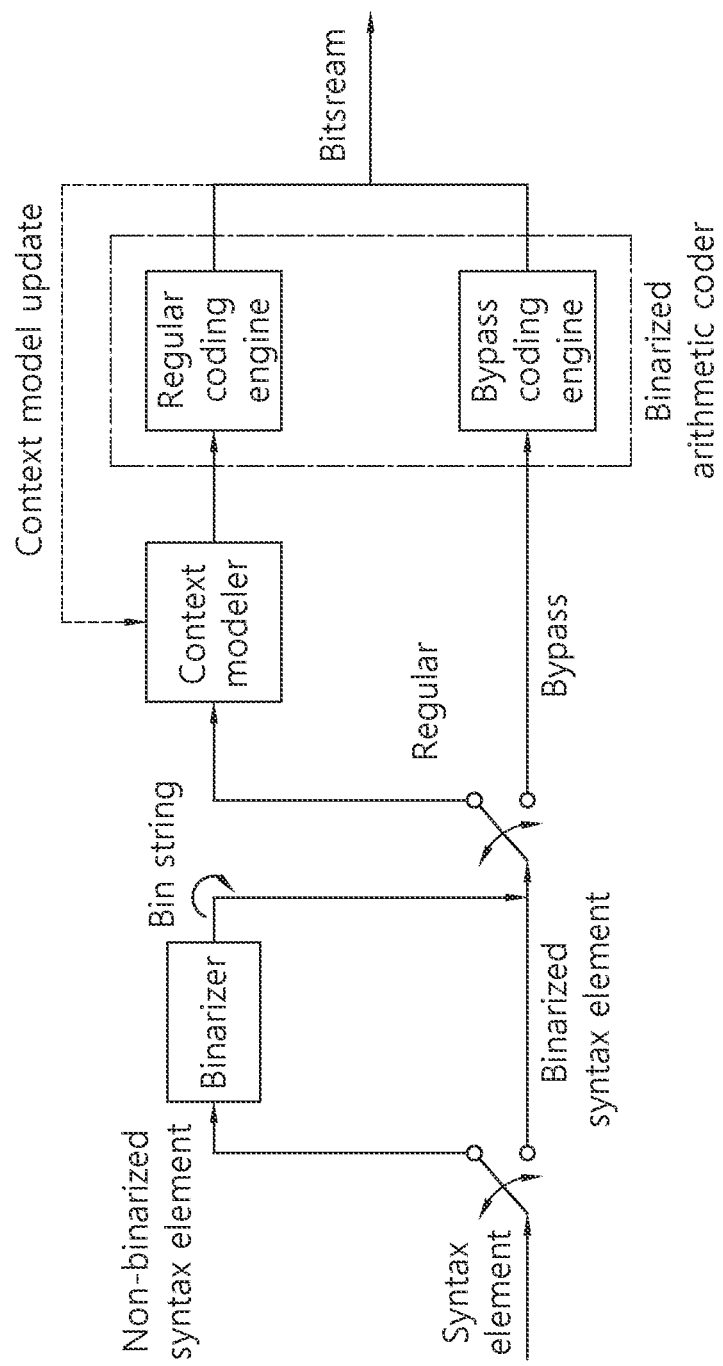
FIG. 4 exemplarily shows context-adaptive binary arithmetic coding (CABAC) for encoding a syntax element.

FIG. 4 exemplarily shows context-adaptive binary arithmetic coding (CABAC) for encoding a syntax element. For example, in the CABAC encoding process, when an input signal is a syntax element, rather than a binary value, the encoding apparatus may convert the input signal into a binary value by binarizing the value of the input signal. In addition, when the input signal is already a binary value (i.e., when the value of the input signal is a binary value), binarization may not be performed and may be bypassed. Here, each binary number 0 or 1 constituting a binary value may be referred to as a bin. For example, if a binary string after binarization is 110, each of 1, 1, and 0 is called one bin. The bin(s) for one syntax element may indicate a value of the syntax element.

Thereafter, the binarized bins of the syntax element may be input to a regular coding engine or a bypass coding engine. The regular coding engine of the encoding apparatus may allocate a context model reflecting a probability value to the corresponding bin, and may encode the corresponding bin based on the allocated context model. The regular coding engine of the encoding apparatus may update a context model for each bin after performing encoding on each bin. A bin encoded as described above may be referred to as a context-coded bin.

Meanwhile, when the binarized bins of the syntax element are input to the bypass coding engine, they may be coded as follows. For example, the bypass coding engine of the encoding apparatus omits a procedure of estimating a probability with respect to an input bin and a procedure of updating a probability model applied to the bin after encoding. When bypass encoding is applied, the encoding apparatus may encode the input bin by applying a uniform probability distribution instead of allocating a context model, thereby improving an encoding rate. The bin encoded as described above may be referred to as a bypass bin.

Entropy decoding may represent a process of performing the same process as the entropy encoding described above in reverse order.

For example, when a syntax element is decoded based on a context model, the decoding apparatus may receive a bin corresponding to the syntax element through a bitstream, determine a context model using the syntax element and decoding information of a decoding target block or a neighbor block or information of a symbol/bin decoded in a previous stage, predict an occurrence probability of the received bin according to the determined context model, and perform an arithmetic decoding on the bin to derive a value of the syntax element. Thereafter, a context model of a bin which is decoded next may be updated with the determined context model.

Also, for example, when a syntax element is bypass-decoded, the decoding apparatus may receive a bin corresponding to the syntax element through a bitstream, and decode the input bin by applying a uniform probability distribution. In this case, the procedure of the decoding apparatus for deriving the context model of the syntax element and the procedure of updating the context model applied to the bin after decoding may be omitted.

As described above, residual samples may be derived as quantized transform coefficients through transform and quantization processes. The quantized transform coefficients may also be referred to as transform coefficients. In this case, the transform coefficients in a block may be signaled in the form of residual information. The residual information may include a residual coding syntax. That is, the encoding apparatus may configure a residual coding syntax with residual information, encode the same, and output it in the form of a bitstream, and the decoding apparatus may decode the residual coding syntax from the bitstream and derive residual (quantized) transform coefficients. The residual coding syntax may include syntax elements representing whether transform was applied to the corresponding block, a location of a last effective transform coefficient in the block, whether an effective transform coefficient exists in the subblock, a size/sign of the effective transform coefficient, and the like, as will be described later.

Meanwhile, the above-described decoded picture buffer (DPB) may be conceptually constructed with a sub-DPB, and the sub-DPB may include a picture storage buffer for storing a decoded picture of one layer. The picture storage buffer may include a decoded picture that is marked as "used for reference" or is retained for future output.

In addition, for multilayer bitstreams, the DPB parameter may not be allocated to each Output Layer Set (OLS), but instead may be allocated to each layer. For example, a maximum of two DPB parameters may be allocated to each layer. one may be allocated when the layer is an output layer (i.e., for example, when the layer can be used for reference and future output), and the other one may be allocated when the layer is not an output layer, but is used as a reference layer (e.g., when there is no layer switching, and when the layer can be used only as a reference of a picture/slice/block of an output layer). This is considered simpler when compared to the DPB parameter for the multilayer bitstream of the HEVC layered extension, where each layer of the OLS has its own DPB parameter.

For example, the signaling of the DPB parameter may be like the syntax and semantic below.

TABLE 1

| | Descriptor |
|---|---|
| video_parameter_set_rbsp( ) { | |
| ... | |
|   if( !vps_all_independent_layers_flag) | |
|     vps_num_dpb_params | ue(v) |
|   if( vps_num_dpb_params > 0 ) { | |
|     same_dpb_size_output_or_nonoutput_flag | u(1) |
|     if( vps_max_sublayers_minus1 > 0 ) | |
|       vps_sublayer_dpb_params_present_flag | u(1) |
|   } | |
|   for( i = 0; i < vps_num_dpb_params; i++ ) { | |
|     dpb_size_only_flag[ i ] | u(1) |
|     if( vps_max_sublayers_minus1 > 0 && !vps_all_layers_same_num_sublayers_flag) | |
|       dpb_max_temporal_id[ i ] | u(3) |
|     dpb_parameters( dpb_size_only_flag[ i ], dpb_max_temporal_id[ i ], vps_sublayer_dpb_params_present_flag ) | |
|   } | |
|   for( i = 0; i < vps_max_layers_minus1 && vps_num_dpb_params > 1; i++) | |
|   { | |
|     if( !vps_independent_layer_flag[ i ]) | |
|       layer_output_dpb_params_idx[ i ] | ue(v) |
|     if( LayerUsedAsRefLayerFlag[ i ] && !same_dpb_size_output_or_nonoutput_flag ) | |
|       layer_nonoutput_dpb_params_idx[ i ] | ue(v) |
|   } | |
|   ... | |
| } | |

For example, Table 1 described above may represent a Video Parameter Set (VPS) including syntax elements for a signaled DPB parameter.

Semantics for the syntax elements shown in Table 1 above may be as follows.

TABLE 2 vps_num_dpb_params specifies the number of dpb_parameters( ) syntax strutcures in the VPS. The value of vps_num_dpb_params shall be in the range of 0 to 16, inclusive. When not present, the value of vps_num_dpb_params is inferred to be equal to 0.
same_dpb_size_output_or_nonoutput_flag equal to 1 specifies that there is no layer_nonoutput_dpb_params_idx[ i ] syntax element present in the VPS.
same_dpb_size_output_or_nonoutput_flag equal to 0 specifies that there may or may not be layer_nonoutput_dpb_params_ idx[ i ] syntax elements present in the VPS.
vps_sublayer_dpb_params_present_flag is used to control the presence of max_dec_pic_buffering_minus1 [ ], max_num_reorder_pics[ ], and max_latency_increase_plus1[ ] syntax elements in the dpb_parameters( ) syntax strucures in the VPS. When not present, vps_sub_dpb_params_info_present_flag is inferred to be equal to 0.
dpb_size_only_flag[ i ] equal to 1 specifies that the max_num_reorder_pics[ ] and max_latency_increase_plus1[ ] syntax elements are not present in the i-th dpb_parameters( ) syntax strucures the VPS. dpb_size_only_flag[ i ] equal to 0 specifies that the max_num_reorder_pics[ ] and max_latency_increase_plus 1[ ] syntax elements may be present in the i-th dpb_parameters( ) syntax strucures the VPS.
dpb_max_temporal_id[ i ] specifies the TemporalId of the highest sublayer representation for which the DPB parameters may be present in the i-th dpb_parameters( ) syntax strutcure in the VPS. The value of dpb_max_temporal_id[ i ] shall be in the range of 0 to vps_max_sublayers_minus1, inclusive. When vps_max_sublayers_minus1 is equal to 0, the value of dpb_max_temporal_id[ i ] is inferred to be equal to 0. When vps_max_sublayers_minus1 is greater than 0 and vps_all_layers_same_num_sublayers_flag is equal to 1, the value of dpb_max_temporal_id[ i ] is inferred to be equal to vps_max_sublayers_minus1.

TABLE 2-continued layer_output_dpb_params_idx[ i ] specifies the index, to the list of dpb_parameters( )
syntax structures in the VPS, of the dpb_parameters( ) syntax structure that applies to the i-th
layer when it is an output layer in an OLS. When present, the value of
layer_output_dpb_params_idx[ i ] shall be in the range of 0 to vps_num_dpb_params − 1,
inclusive.
If vps_independent_layer_flag[ i ] is equal to 1, the dpb_parameters( ) syntax structure that
applies to the i-th layer when it is an output layer is the dpb_parameters( ) syntax structure
present in the SPS referred to by the layer.
Otherwise (vps_independent_layer_flag[ i ] is equal to 0), the following applies:
- When vps_num_dpb_params is equal to 1, the value of
  layer_output_dpb_params_idx[ i ] is inferred to be equal to 0.
- It is a requirement of bitstream conformance that the value of
  layer_output_dpb_params_idx[ i ] shall be such that
  dpb_size_only_flag[ layer_output_dpb_params_idx[ i ] ] is equal to 0.
layer_nonoutput_dpb_params_idx[ i ] specifies the index, to the list of dpb_parameters( )
syntax structures in the VPS, of the dpb_parameters() syntax structure that applies to the i-th
layer when it is a non-output layer in an OLS. When present, the value of
layer_nonoutput_dpb_params_idx[ i ] shall be in the range of 0 to vps_num_dpb_params
− 1, inclusive.
If same_dpb_size_output_or_nonoutput_flag is equal to 1, the following applies:
- If vps_independent_layer_flag[ i ] is equal to 1, the dpb_parameters( ) syntax structure
  that applies to the i-th layer when it is a non-output layer is the dpb_parameters( )
  syntax structure present in the SPS referred to by the layer.
- Otherwise (vps_independent_layer_flag[ i ] is equal to 0), the value of
  layer_nonoutput_dpb_params_idx[ i ] is inferred to be equal to
  layer_output_dpb_params_idx[ i ].
Otherwise (same_dpb_size_output_or_nonoutput_flag is equal to 0), when
vps_num_dpb_params is equal to 1, the value of layer_output_dpb_params_idx[ i ] is
inferred to be equal to 0.

For example, the syntax element vps_num_dpb_params may represent the number of dpb_parameters( ) syntax structures in the VPS. For example, the value of vps_num_dpb_params may be in the range of 0 to 16. Also, when the syntax element vps_num_dpb_params is not present, the value of the syntax element vps_num_dpb_params may be inferred to be equal to 0.

Also, for example, the syntax element same_dpb_size_output_or_nonoutput_flag may indicate whether the syntax element layer_nonoutput_dpb_params_idx[i] may be present in the VPS. For example, when the value of the syntax element same_dpb_size_output_or_nonoutput_flag is 1, the syntax element same_dpb_size_output_or_nonoutput_flag may indicate that syntax element layer_nonoutput_dpb_params_idx[i] is not present in the VPS, while, when the value of the syntax element same_dpb_size_output_or_nonoutput flag is 0, the syntax element same_dpb_size_output_or_nonoutput_flag may indicate that the syntax element layer_nonoutput_dpb_params_idx[i] may be present in the VPS.

Also, for example, the syntax element vps_sublayer_dpb_params_present_flag may be used to control the presence of syntax elements max_dec_pic_buffering_minus1[ ], max_num_reorder_pics[ ], and max_latency_increase_plus1[ ] in the dpb_parameters( ) syntax structure of the VPS. Also, when the syntax element vps_sublayer_dpb_params_present_flag is not present, the value of the syntax element vps_sublayer_dpb_params_present_flag may be inferred to be equal to 0.

Also, for example, the syntax element dpb_size_only_flag[i] may indicate whether the syntax elements max_num_reorder_pics[ ] and max_latency_increase_plus1[ ] may be present in the i-th dpb_parameters( ) syntax structure of the VPS. For example, when the value of the syntax element dpb_size_only_flag[i] is 1, the syntax element dpb_size_only_flag[i] indicates that the syntax elements max_num_reorder_pics[ ] and max_latency_increase_plus1[ ] are not present in the i-th dpb_parameters( ) syntax structure of the VPS, while, when the value of the syntax element dpb_size_only_flag[i] is 0, the syntax element dpb_size_only_flag[i] may indicate that the syntax elements max_num_reorder_pics[ ] and max_latency_increase_plus1[ ] may be present in the i-th dpb_parameters( ) syntax structure of the VPS.

Also, for example, the syntax element dpb_max_temporal_id[i] may indicate the TemporalId of the highest sublayer representation in which the DPB parameter may exist in the i-th dpb_parameters( ) syntax structure in the VPS. Also, the value of dpb_max_temporal_id[i] may be in the range of 0 to vps_max_sublayers_minus1. Also, for example, when the value of vps_max_sublayers_minus1 is 0, the value of dpb_max_temporal_id[i] may be inferred to be 0. Also, for example, when the value of vps_max_sublayers_minus1 is greater than 0 and vps_all_layers_same_num_sublayers_flag is 1, the value of dpb_max_temporal_id[i] may be inferred to be equal to vps_max_sublayers_minus1.

Also, for example, the syntax element layer_output_dpb_params_idx[i] may specify the index of the dpb_parameters( ) syntax structure applied to the i-th layer, which is the output layer of the OLS, to the list of dpb_parameters( ) syntax structures of the VPS. When the syntax element layer_output_dpb_params_idx[i] is present, the value of the syntax element layer_output_dpb_params_idx[i] may be in the range of 0 to vps_num_dpb_params−1.

For example, when vps_independent_layer_flag[i] is 1, the dpb_parameters( ) syntax structure applied to the i-th layer which is the output layer may be the dpb_parameters( ) syntax structure present in the SPS referred to by the layer.

Alternatively, for example, when vps_independent_layer_flag[i] is 0, the following may be applied.

When vps_num_dpb_params is 1, the value of layer_output_dpb_params_idx[i] may be inferred to be equal to 0.

It may be a requirement of bitstream conformance that the value of layer_output_dpb_params_idx[i] is such that the value of dpb_size_only_flag[layer_output_dpb_params_idx[i]] is equal to 0.

Also, for example, the syntax element layer_nonoutput_dpb_params_idx[i] may specify the index of the dpb_parameters( ) syntax structure applied to the i-th layer, which is a non-output layer of the OLS, to the list of the dpb_parameters( ) syntax structure of the VPS. When the syntax element layer_nonoutput_dpb_params_idx[i] is present, the value of the syntax element layer_nonoutput_dpb_params_idx[i] may be in the range of 0 to vps_num_dpb_params−1.

For example, when same dpb size output or nonoutput flag is 1, the following may be applied.

When vps_independent_layer_flag[i] is 1, the dpb_parameters( ) syntax structure applied to the i-th layer which is a non-output layer may be the dpb_parameters( ) syntax structure present in the SPS referred by the layer.

When vps_independent_layer_flag[i] is 0, the value of layer_nonoutput_dpb_params_idx[i] may be inferred to be equal to layer_output_dpb_params_idx[i].

Alternatively, for example, when same_dpb_size_output_or_nonoutput_flag is 0, and when vps_num_dpb_params is 1, the value of layer_output_dpb_params_idx[i] may be inferred to be 0.

Meanwhile, for example, the dpb_parameters( ) syntax structure may be like the syntax and semantic below.

TABLE 3

| | Descriptor |
| --- | --- |
| dpb_parameters( dpbSizeOnlyFlag, maxSubLayersMinus1, subLayerInfoFlag ) {   for( i = ( subLayerInfoFlag ? 0 : maxSubLayersMinus1 );       i <= maxSubLayersMinus1; i++ ) {     max_dec_pic_buffering_minus1[ i ] | ue(v) |
|     if( !dpbSizeOnlyFlag ) {       max_num_reorder_pics[ i ] | ue(v) |
|       max_latency_increase_plus1[ i ]     }   } } | ue(v) |

Referring to Table 3, the dpb_parameters( ) syntax structure may provide information on the DPB size for each CLVS of the CVS, the maximum picture reorder number, and the maximum latency. The dpb_parameters( ) syntax structure may be represented as information on DPB parameters or DPB parameter information.

When the dpb_parameters( ) syntax structure is included in the VPS, the OLS to which the dpb_parameters( ) syntax structure is applied may be specified by the VPS. In addition, when the dpb_parameters( ) syntax structure is included in the SPS, the dpb_parameters( ) syntax structure may be applied to an OLS including only the lowest layer among the layers making reference to the SPS, wherein the lowest layer may be an independent layer.

Semantics for the syntax elements shown in Table 3 above may be as follows.

TABLE 4 max_dec_pic_buffering_minus1[ i ] plus 1 specifies, for each for each CLVS of the CVS, the maximum required size of the DPB in units of picture storage buffers when Htid is equal to i. The value of max_dec_pic_buffering_minus1[ i ] shall be in the range of 0 to MaxDpbSize − 1, inclusive, where MaxDpbSize is as specified in clause A.4.2. When i is greater than 0, max_dec_pic_buffering_minus1 [ i ] shall be greater than or equal to max_dec_pic_buffering_minus 1 [ i − 1 ]. When max_dec_pic_buffering_minus 1 [ i ] is not present for i in the range of 0 to maxSubLayersMinus1 − 1, inclusive, due to subLayerInfoFlag being equal to 0, it is inferred to be equal to max_dec_pic_buffering_minus1 [ maxSubLayersMinus1 ].
max_num_reorder_pics[ i ] specifies, for each CLVS of the CVS, the maximum allowed number of pictures of the CLVS that can precede any picture in the CLVS in decoding order and follow that picture in output order when Htid is equal to i. The value of max_num_reorder_pics[ i ] shall be in the range of 0 to max_dec_pic_buffering_minus1 [ i ], inclusive. When i is greater than 0, max_num_reorder_pics[ i ] shall be greater than or equal to max_num_reorder_pics[ i − 1 ]. When max_num_reorder_pics[ i ] is not present for i in the range of 0 to maxSubLayersMinus1 − 1, inclusive, due to subLayerInfoFlag being equal to 0, it is inferred to be equal to max_num_reorder_pics[ maxSubLayersMinus1 ].
max_latency_increase_plus1[ i ] not equal to 0 is used to compute the value of MaxLatencyPictures[ i ], which specifies, for each CLVS of the CVS, the maximum number of pictures in the CLVS that can precede any picture in the CLVS in output order and follow that picture in decoding order when Htid is equal to i.

TABLE 4-continued

When max_latency_increase_plus1[ i ] is not equal to 0, the value of MaxLatencyPictures
[ i ]
is specified as follows:
  MaxLatencyPictures[ i ] =
    max_num_reorder_pics[ i ] + max_latency_increase_plus1[ i ] − 1      (7-73)
When max_latency_increase_plus1[ i ] is equal to 0, no corresponding limit is expressed.
The value of max_latency_increase_plus1[ i ] shall be in the range of 0 to $2^{32} − 2$, inclusive.
When max_latency_increase_plus1[ i ] is not present for i in the range of 0 to
maxSubLayersMinus1 − 1, inclusive, due to subLayerInfoFlag being equal to 0, it is inferred
to be equal to max_latency_increase_plus1[ maxSubLayersMinus1 ].

For example, the syntax element max_decpic_buffering_minus1[i] plus 1 may specify, for each CLVS of the CVS, the maximum required size of the DPB in units of picture storage buffers when Htid is equal to i. For example, max_dec_pic_buffering_minus1[i] may be information on the DPB size. For example, the value of the syntax element max_dec_pic_buffering_minus1[i] may be in the range of 0 to MaxDpbSize−1. Also, for example, when i is greater than 0, max_dec_pic_buffering_minus1[i] may be greater than or equal to max_dec_pic_buffering_minus1[i−1]. Also, for example, if max_dec_pic_buffering_minus1[i] for i in the range of 0 to maxSubLayersMinus1−1 is not present, due to subLayerInfoFlag being equal to 0, the value of the syntax element max_dec_pic_buffering_minus1[i] may be inferred to be equal to max_dec_pic_buffering_minus1[maxSubLayersMinus1].

Also, for example, the syntax element max_num_reorder_pics[i] may specify, for each CLVS of CVS, the maximum allowed number of pictures of the CLVS that can precede all pictures of CLVS in decoding order and follow the corresponding picture in output order when Htid is equal to i. For example, max_num_reorder_pics[i] may be information on the maximum picture reorder number of the DPB. The value of max_num_reorder_pics[i] may be in the range of 0 to max_dec_pic_buffering_minus1[i]. Also, for example, when i is greater than 0, max_num_reorder_pics[i] may be greater than or equal to max_num_reorder_pics[i−1]. Also, for example, if max_num_reorder_pics[i] for i in the range of 0 to maxSubLayersMinus1−1 is not present, due to subLayerInfoFlag being equal to 0, the syntax element max_num_reorder_pics[i] may be inferred to be equal to max_num_reorder_pics[maxSubLayersMinus1].

Also, for example, a syntax element max_latency_increase_plus1[i] whose value is not 0 may be used to calculate the value of MaxLatencyPictures[i]. The MaxLatencyPictures[i] may specify, for each CLVS of CVS, the maximum number of pictures of the CLVS that can precede all pictures of CLVS in output order and follow the corresponding picture in decoding order when Htid is equal to i. For example, max_latency_increase_plus1[i] may be information on the maximum latency of the DPB.

For example, when max_latency_increase_plus1[i] is not 0, the value of MaxLatencyPictures[i] may be derived as following equation.

$$\text{MaxLatencyPictures}[i] = \text{max\_num\_reorder\_pics}[i] + \text{max\_latency\_increase\_plus1}[i] - 1 \quad \text{[Equation 1]}$$

Meanwhile, for example, if max_latency_increase_plus1[i] is 0, no corresponding limit may be expressed. The value of the max_latency_increase_plus1[i] may be in the range of 0 to $2^{32}-2$. Also, for example, if max_latency_increase_plus1[i] for i in the range of 0 to maxSubLayersMinus1−1 is not present, due to subLayerInfoFlag being equal to 0, the syntax element max_latency_increase_plus1[i] may be inferred to be equal to max_latency_increase_plus1[maxSubLayersMinus1].

Meanwhile, the DPB parameter may be used for output and removal of a picture process as shown in the following table.

TABLE 5

The DPB parameter is used in the output and removal of picture process as follows:
The output and removal of (decoded) pictures from the DPB before the decoding of the
current picture (but after parsing the slice header of the first slice of the current picture)
happens instantaneously when the first DU of the AU containing the current picture is
removed from the CPB and proceeds as follows:
- The decoding process for reference picture list construction as specified in clause 8.3.2
  and decoding process for reference picture marking as specified in cluase 8.3.3 are
  invoked.
- If the current picture is a CLVSS picture that is not picture 0, the following ordered steps
  are applied:
  1. The variable NoOutputOfPriorPicsFlag is derived for the decoder under test as
    follows:
    - If the value of pic_width_max_in_luma_samples,
      pic_height_max_in_luma_samples, chroma_format_idc,
      separate_colour_plane_flag, bit_depth_minus8, or
      max_dec_pic_buffering_minus1[ Htid ] derived for any picture of the current
      AU is different from the value of pic_width_max_in_luma_samples,
      pic_height_max_in_luma_samples, chroma_format_idc,
      separate_colour_plane_flag, bit_depth_minus8, or
      max_dec_pic_buffering_minus1[ Htid ], respectively, for the preceding picture
      in the same CLVS, NoOutputOfPriorPicsFlag may (but should not) be set to 1
      by the decoder under test, regardless of the value of
      no_output_of_prior_pics_flag.
        NOTE - Although setting NoOutputOfPriorPicsFlag equal to
        no_output_of_prior_pics_flag is preferred under these conditions, the
        decoder under test is allowed to set NoOutputOfPriorPicsFlag to 1 in this
        case.

TABLE 5-continued

- Otherwise, NoOutputOfPriorPicsFlag is set equal to
  no_output_of_prior_pics_flag.
2. The value of NoOutputOfPriorPicsFlag derived for the decoder under test is applied
   for the HRD as follows:
  - If NoOutputOfPriorPicsFlag is equal to 1, all picture storage buffers in the DPB
    are emptied without output of the pictures they contain and the DPB fullness is
    set equal to 0.
  - Otherwise (NoOutputOfPriorPicsFlag is equal to 0), all picture storage buffers
    containing a picture that is marked as "not needed for output" and "unused for
    reference" are emptied (without output) and all non-empty picture storage
    buffers in the DPB are emptied by repeatedly invoking the "bumping" process
    specified in clause C.5.2.4 and the DPB fullness is set equal to 0.
- Otherwise (the current picture is not a CLVSS picture), all picture storage buffers
  containing a picture which are marked as "not needed for output" and "unused for
  reference" are emptied (without output). For each picture storage buffer that is emptied,
  the DPB fullness is decremented by one. When one or more of the following conditions
  are true, the "bumping" process specified in clause C.5.2.4 is invoked repeatedly while
  further decrementing the DPB fullness by one for each additional picture storage buffer
  that is emptied, until none of the following conditions are true:
- The number of pictures in the DPB that are marked as "needed for output" is greater
  than max_num_reorder_pics[ Htid ].
- max_latency_increas_plus1 [ Htid ] is not equal to 0 and there is at least one picture in
  the DPB that is marked as "needed for output" for which the associated variable
  PicLatencyCount is greater than or equal to MaxLatencyPictures[ Htid ].
- The number of pictures in the DPB is greater than or equal to
  max_dec_pic_buffering_minus 1 [ Htid ] + 1.

Meanwhile, the DPB parameter signaling design in the conventional VVC standard may have at least the following problems.

First, the VVC draft text considered the concept of a sub-DPB, but a physical decoding apparatus can have only one DPB for decoding multilayer bitstreams. Therefore, the decoding apparatus needs to know the DPB size requirement before decoding OLS in a given multilayer bitstream, but conventional VVC draft texts do not clearly disclose how such information is made known.

For example, the DPB size required for OLS in the bitstream may not be simply derived from the sub-DPB size of each layer of the OLS. That is, the DPB size required for OLS may not simply be derived as the sum of max-_decpic_buffering_minus1[ ]+1 values of layers in the OLS. For example, the sum of max_decpic_buffering_minus1[ ]+1 of each layer in the OLS may be greater than the actual DPB size. For example, in a specific access unit, since each layer in the DPB may have a different reference picture list structure, the number of reconstructed pictures of each layer in the DPB may not be the maximum, and therefore, the DPB size required for the OLS may not be simply derived from the sum of max_dec_pic_buffering_minus1[ ]+1 values of the layers in the OLS.

For example, the following table exemplarily shows pictures required for each sub-DPB to be present for a bitstream with two spatial scalability layers, a group of pictures (GOP) size of 16, and no temporal sublayer.

TABLE 6

| | | Sub-DPB 0 | | | Sub-DPB 1 | | | Total ref pics in DPB + |
|---|---|---|---|---|---|---|---|---|
| RPL # | POC | #Ref Pics | Ref pic list | Total pics | #Ref Pics | Ref pic list | Total pics | current pics |
| 1 | 48 | 3 | 16, 24, 32 | 4 | 3 | 16, 24, 32 | 4 | 8 |
| 2 | 40 | 3 | 24, 32, 48 | 4 | 3 | 24, 32, 48 | 4 | 8 |
| 3 | 36 | 4 | 24, 32, 40, 48 | 5 | 4 | 24, 32, 40, 48 | 5 | 10 |
| 4 | 34 | 5 | 24, 32, 36, 40, 48 | 6 | 4 | 32, 36, 40, 48 | 5 | 11 |
| 5 | 33 | 5 | 32, 34, 36, 40, 48 | 6 | 4 | 32, 36, 40, 48 | 5 | 11 |
| 6 | 35 | 5 | 32, 34, 36, 40, 48 | 6 | 4 | 32, 36, 40, 48 | 5 | 11 |
| 7 | 38 | 5 | 32, 34, 36, 40, 48 | 6 | 4 | 32, 36, 40, 48 | 5 | 11 |
| 8 | 37 | 6 | 32, 34, 36, 38, 40, 48 | 7 | 3 | 32, 40, 48 | 4 | 11 |
| 9 | 39 | 6 | 32, 34, 36, 38, 40, 48 | 7 | 3 | 32, 40, 48 | 4 | 11 |
| 10 | 44 | 6 | 32, 34, 36, 38, 40, 48 | 7 | 3 | 32, 40, 48 | 4 | 11 |
| 11 | 42 | 5 | 32, 36, 40, 44, 48 | 6 | 4 | 32, 40, 44, 48 | 5 | 11 |
| 12 | 41 | 5 | 32, 36, 40, 44, 48 | 6 | 4 | 32, 40, 44, 48 | 5 | 11 |
| 13 | 43 | 5 | 32, 36, 40, 44, 48 | 6 | 4 | 32, 40, 44, 48 | 5 | 11 |
| 14 | 46 | 4 | 32, 40, 44, 48 | 5 | 4 | 32, 40, 44, 48 | 5 | 10 |
| 15 | 45 | 5 | 32, 40, 44, 46, 48 | 6 | 4 | 32, 40, 44, 48 | 5 | 11 |
| 16 | 47 | 5 | 32, 40, 44, 46, 48 | 6 | 4 | 32, 40, 44, 48 | 5 | 11 |
| | | | Max pics | 7 | | Max pics | 5 | 11 |

Referring to Table 6, the base layer (i.e., layer 0) may have a more complex RPL structure than layer 1, and the size of sub DPB 0 may include more reference pictures than sub DPB 1 in consideration of the picture size between the two layers. Also, for example, as shown in Table 6, the maximum number of reference pictures of the two layers (i.e., 12) may be greater than the number of actual total pictures of the DPB 11).

Second, the bumping process may not be invoked when it is actually needed. When using the above-described example, the number of pictures of sub-DPB 1 does not reach the maximum sub-DPB size after the first slice header of a picture having a picture order count (POC) 37 of the second layer has been decoded, and thus the bumping process may not be invoked. That is, if the picture having POC 37 is included, the number of pictures of sub-DPB 1 may be 4, and the maximum number of pictures of sub-DPB 1 may increase up to 5. However, since the maximum number of pictures of the DPB has already been reached, the bumping process must be invoked at the corresponding time. Such problem may occur because only the DPB parameter of the current layer is checked under the condition that the bumping process is invoked. Here, for example, the bumping process may refer to a process of deriving pictures necessary for output among pictures in the DPB and removing pictures not used as references from the DPB.

Accordingly, this document proposes a solution to the above-described problem. The proposed embodiments may be applied individually or in combination.

As an example, a method of signaling the DPB parameter mapped to the OLS in addition to signaling the DPB parameter mapped to each layer is proposed.

Also, as an example, there may be provided a method by which the value of max_dec_pic_buffering_minus1[i] is derived such that it is equal to the value obtained by subtracting 1 from the sum of values obtained by adding 1 to max_dec_pic_buffering_minus1[i] for all layers in the OLS, when the DPB parameter does not exist since signaling of the DPB parameter mapped to the OLS may be optional. The method proposed in this embodiment may be performed based on a flag indicating whether a DPB parameter mapped to the OLS is present. For example, when the value of the flag is 1, the flag may indicate that the DPB parameter index for all OLSs including at least one or more layers are present, or otherwise, that is, when the value of the flag is 0, the flag may indicate that a DPB parameter mapped to the OLS (i.e., the DPB parameter index for the OLS) is not present. Meanwhile, for example, the flag may be present for each OLS.

Also, as an example, there may be provided a method by which the value of max_dec_pic_buffering_minus1[hightest temporal sublayer] of each OLS is not greater than the value obtained by subtracting 1 from the sum of the value obtained by subtracting 1 from MaxDpbSize and the values obtained by adding 1 to max_dec_pic_buffering_minus1[hightes temporal sublayer] of layers within the OLS.

Also, as an example, there may be proposed a method in which the DPB parameter allocated to the OLS includes only the DPB size.

Also, as an example, there may be proposed a method of updating a condition for invoking the bumping process in consideration of the number of pictures in the DPB and the value of max_dec_pic_buffering_minus1[i] of the OLS being processed by the decoding apparatus.

Meanwhile, for example, embodiment(s) may be applied according to the following procedure.

Figure 5:
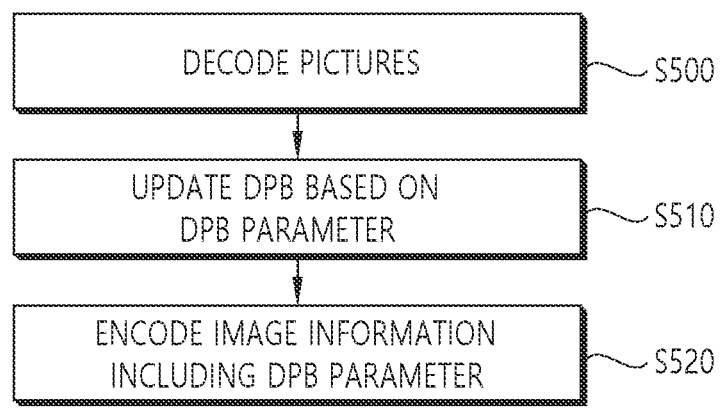
FIG. 5 illustratively represents an encoding process according to an embodiment of the present document.

FIG. 5 illustratively represents an encoding procedure according to an embodiment of the present document.

Referring to FIG. 5, the encoding apparatus may decode (reconstructed) pictures (S500). The encoding apparatus may update the DPB based on the DPB parameter (S510). For example, the decoded picture may be basically inserted into the DPB, and the decoded picture may be used as a reference picture for inter prediction. Also, a decoded picture in the DPB may be deleted based on the DPB parameter. Also, the encoding apparatus may encode image information including the DPB parameter (S520). Also, although not shown, the encoding apparatus may further decode the current picture based on the DPB updated after step S510. In addition, the decoded current picture may be inserted into the DPB, and the DPB including the decoded current picture may be further updated based on the DPB parameter before decoding the next picture in decoding order.

Figure 6:
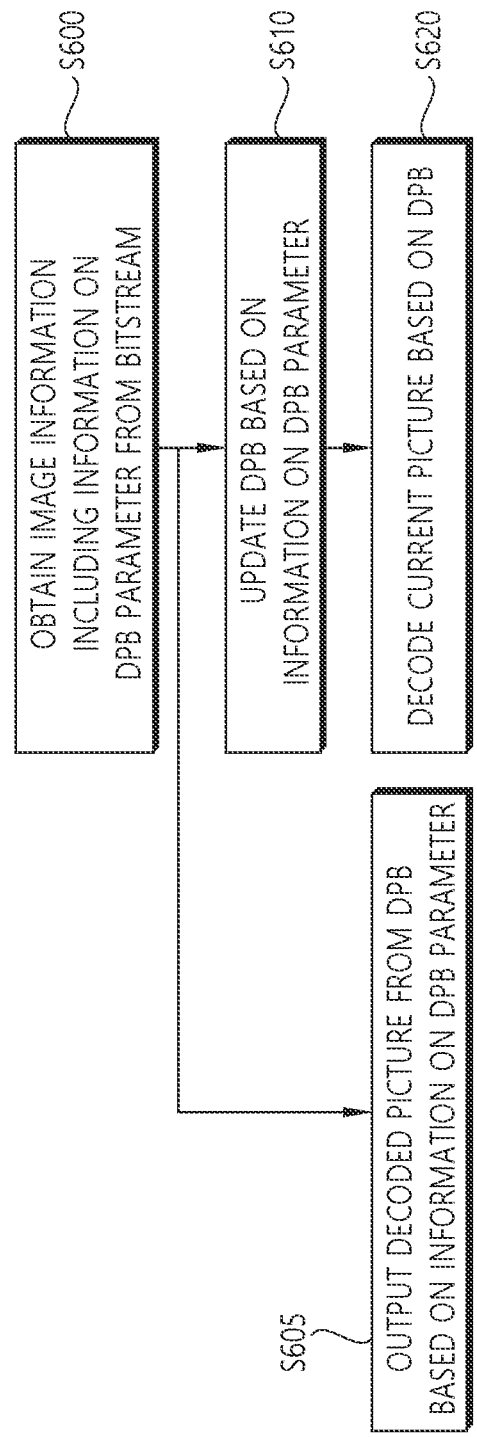
FIG. 6 illustratively represents a decoding process according to an embodiment of the present document.

FIG. 6 illustratively represents a decoding procedure according to an embodiment of the present document.

Referring to FIG. 6, the decoding apparatus may obtain image information including information on the DPB parameter from the bitstream (S600). The decoding apparatus may output a picture decoded from the DPB based on the information on the DPB parameter (S605). Meanwhile, when the layer related to the DPB (or the DPB parameter) is not an output layer but a reference layer, the step S605 may be omitted.

Also, the decoding apparatus may update the DPB based on the information on the DPB parameter (S610). The decoded picture may be basically inserted into the DPB. Then, the DPB may be updated before decoding the current picture. For example, a decoded picture in the DPB may be deleted based on the information on the DPB parameter. Here, the DPB updating may be referred to as DPB management.

The information on the DPB parameter may include the information/syntax element disclosed in Tables 1 and 3 described above. Additionally, for example, different DPB parameter(s) may be signaled depending on whether the current layer is an output layer or a reference layer, or different DPB parameter(s) may be signaled depending on whether the DPB (or DPB parameter) is for OLS (mapped to OLS) as in the embodiment proposed in this document.

Meanwhile, the decoding apparatus may decode the current picture based on the DPB (S620). For example, the decoding apparatus may decode the current picture based on inter prediction for the block/slice of the current picture using the decoded picture (prior to the current picture) of the DPB as a reference picture.

Meanwhile, although not shown, the encoding apparatus may decode the current picture based on the DPB updated after the above-described step 5610. In addition, the decoded current picture may be inserted into the DPB, and the DPB including the decoded current picture may be further updated based on the DPB parameter before decoding the next picture.

The syntax and DPB management process to which the embodiments proposed in this document are applied will be described below.

As an embodiment, the signaled video parameter set (VPS) syntax may be as follows.

TABLE 7

| | Descriptor |
|---|---|
| video_parameter_set_rbsp( ) { | |
| ... | |
|   if( !vps_all_independent_layers_flag ) | |
|     vps_num_dpb_params | ue(v) |
|   if( vps_num_dpb_params > 0 ) { | |
|     same_dpb_size_output_or_nonoutput_flag | u(1) |
|     if( vps_max_sublayers_minus 1 > 0 ) | |
|       vps_sublayer_dpb_params_present_flag | u(1) |
|   } | |
|   for( i = 0; i < vps_num_dpb_params; i++ ) { | |
|     dpb_size_only_flag[ i ] | u(1) |
|     if( vps_max_sublayers_minus1 > 0 && !vps_all_layers_same_num_sublayers_flag) | |
|       dpb_max_temporal_id[ i ] | u(3) |
|     dpb_parameters( dpb_size_only_flag[ i ], dpb_max_temporal_id[ i ], | |
|       vps_sublayer_dpb_params_present_flag) | |
|   } | |
|   for( i = 0; i < vps_max_layers_minus1 && vps_num_dpb_params > 1; i++ ) | |
| { | |
|     if( !vps_independent_layer_flag[ i ] ) | |
|       layer_output_dpb_params_idx i J | ue(v) |
|     if( LayerUsedAsRefLayerFlag[ i ] && !same_dpb_size_output_or_nonoutput_flag) | |
|       layer_nonoutput_dpb_params_idx[ i ] | ue(v) |
|   } | |
|   vps_ols_dpb_params_present_flag | u(1) |
|   for( i = 0; i < TotalNumOlss && | |
|     vps_cls_dpb_params_present_flag && vps_num_dpb_params > 1; i++) | |
|     if(NumLayersInOls[ i ] > 1 ) | |
|       ols_dpb_params_idx[ i ] | ue(v) |
|   ... | |
| } | |

Referring to Table 7, the VPS may include syntax element vps_num_dpb_params, same_dpb_size_output_or_nonoutput_flag, vps_sublayer_dpb_params_present_flag, dpb_size_only_flag[i], dpb_max_temporal_id[i], layer_output_dpb_params_idx[i], and/or layer_nonoutput_dpb_params_idx[i].

In addition, referring to Table 7, the VPS may further include a syntax element vps_ols_dpb_params_present_flag and/or ols_dpb_params_idx[i].

For example, the syntax element vps_ols_dpb_params_present_flag may indicate whether ols_dpb_params_idx[ ] may be present. For example, when the value of vps_ols_dpb_params_present_flag is 1, vps_ols_dpb_params_present_flag may indicate that ols_dpb_params_idx[ ] may be present, while, when the value of vps_ols_dpb_params_present_flag is 0, vps_ols_dpb_params_present_flag may indicate that ols_dpb_params_idx[ ] is not present. Meanwhile, when vps_ols_dpb_params_present_flag is not present, the value of vps_ols_dpb_params_present_flag may be inferred to be 0.

Also, for example, when i is less than TotalNumOlss, and when vps_ols_dpb_params_present_flag is 1, and when vps_num_dpb_params is greater than 1, and if NumLayersInOls[i] is greater than 1, then the syntax element ols_dpb_params_idx[i] may be signaled. The ols_dpb_params_idx[i] may be represented as vps_ols_dpb_params_idx[i].

For example, when NumLayersInOls[i] is greater than 1, the syntax element ols_dpb_params_idx[i] may specify the index of the dpb_parameters( ) syntax structure applied to the i-th OLS, in the list of dpb_parameters( ) syntax structure of the VPS. That is, for example, the syntax element ols_dpb_params_idx[i] may indicate the dpb_parameters( ) syntax structure of the VPS for the target OLS (i.e., the i-th OLS). When ols_dpb_params_idx[i] is present, the value of ols_dpb_params_idx[i] may be in the range of 0 to vps_num_dpb_params−1.

Also, for example, when NumLayersInOls[i] is equal to 1, the dpb_parameters( ) syntax structure applied to the i-th OLS may be present in the SPS referenced by the layer in the i-th OLS.

Meanwhile, according to the present embodiment, OlsMaxDecPicBufferingMinus1[Htid] may be defined as follows.

TABLE 8

In the HRD and conformance specification, define the value of OlsMaxDecPicBufferingMinus1[ Htid ] as follows:
...
For each bitstream conformance test, the CPB size (number of bits) is CpbSize[ Htid ][ ScIdx ] as specified in clause 7.4.6.3, where ScIdx and the HRD parameters are specified above in this clause, and DPB parameters max_dec_pic_buffering_minus1[ Htid ], max_num_reorder_pics[ Htid ], and MaxLatencyPictures[ Htid ] for each layer are found in or derived from the TABLE 8-continued dpb_parameters( ) syntax structure that applies to the layer depending on whether the
layer is an independent layer and whether the layer is an output layer of the target OLS.
For the target OLS, the value of OlsMaxDecPicBufferingMinus1[ Htid] is derived as
follows:
  - If vps_ols_dpb_params_present_flag is equal to 1,
    OlsMaxDecPicBufferingMinus1[ Htid] is equal to the value of
    max_dec_pic_buffering_minus1[ Htid ] in the ols_dpb_params_idx[ opOlsIdx ].
  - Otherwise, OlsMaxDecPicBufferingMinus1[ Htid] is equal to the sum of
    max_dec_pic_buffering_minus1[ Htid ] + 1 of each layer in the target OLS
    minus 1.
  ...

For example, referring to Table 8, the value of OlsMaxDecPicBufferingMinus1[Htid] for the target OLS may be derived as follows.

For example, when the value of vps_ols_dpb_params_present_flag is 1, OlsMaxDecPicBufferingMinus1[Htid] may be derived such that it is equal to the value of max_dec_pic_buffering_minus1[Htid] in ols_dpb_params_idx [opOlsIdx].

Also, for example, in other case, that is, when the value of vps_ols_dpb_params_present_flag is 0, OlsMaxDecPicBufferingMinus1[Htid] may be derived such that it is equal to the value obtained by subtracting 1 from the sum of max_dec_pic_buffering_minus1[Htid]+1 of each layer in the target OLS.

Also, according to the present embodiment, the picture output and removal process (i.e., the DPB management process) may be defined as follows.

TABLE 9

The output and removal of pictures from the DPB before the decoding of the current picture
(but after parsing the slice header of the first slice of the current picture) happens
instantaneously when the first DU of the AU containing the current picture is removed from
the CPB and proceeds as follows:
- The decoding process for reference picture list construction as specified in clause 8.3.2
  and decoding process for reference picture marking as specified in clause 8.3.3 are
  invoked.
- If the current picture is a CLVSS picture that is not picture 0, the following ordered steps
  are applied:
  1. The variable NoOutputOfPriorPicsFlag is derived for the decoder under test as
     follows:
       - If the value of pic width_max_in_luma_samples,
         pic_height_max_in_luma_samples, chroma_format_idc,
         separate_colour_plane_flag, bit_depth_minus8, or
         vmax_dec_pic_buffering_minus 1[ Htid ] derived for any picture of the current
         AU is different from the value of pic_width_max_in_luma_samples,
         pic_height_max_in_luma_samples, chroma_format_idc,
         separate_colour_plane_flag,bit_depth_minus8, or
         max_dec_pic_buffering_minus1[ Htid ], respectively, for the preceding picture
         in the same CLVS, NoOutputOfPriorPicsFlag may (but should not) be set to 1
         by the decoder under test, regardless of the value of
         no_output_of_prior_pics_flag.
           NOTE-Although setting NoOutputOfPriorPicsFlag equal to
           no_output_of_prior_pics_flag is preferred under these conditions, the
           decoder under test is allowed to set NoOutputOfPriorPicsFlag to 1 in this
           case.
       - Otherwise, NoOutputOfPriorPicsFlag is set equal to
         no_output_of_prior_pics_flag.
  2. The value of NoOutputOfPriorPicsFlag derived for the decoder under test is applied
     for the HRD as follows:
       - If NoOutputOfPriorPicsFlag is equal to 1, all picture storage buffers in the DPB
         are emptied without output of the pictures they contain and the DPB fullness is
         set equal to 0.
       - Otherwise (NoOutputOfPriorPicsFlag is equal to 0), all picture storage buffers
         containing a picture that is marked as "not needed for output" and "unused for
         reference" are emptied (without output) and all non-empty picture storage
         buffers in the DPB are emptied by repeatedly invoking the "bumping" process
         specified in clause C.5.2.4 and the DPB fullness is set equal to 0.
- Otherwise (the current picture is not a CLVSS picture), all picture storage buffers
  containing a picture which are marked as "not needed for output" and "unused for
  reference" are emptied (without output). For each picture storage buffer that is emptied,
  the DPB fullness is decremented by one. When one or more of the following conditions
  are true, the "bumping" process specified in clause C.5.2.4 is invoked repeatedly while
  further decrementing the DPB fullness by one for each additional picture storage buffer
  that is emptied, until none of the following conditions are true:
  - The number of pictures in the DPB that are marked as "needed for output" is greater
    than max_num_reorder_pics[ Htid ].
  - max_latency_increase_plus1[ Htid ] is not equal to 0 and there is at least one picture in
    the DPB that is marked as "needed for output" for which the associated variable
    PicLatencyCount is greater than or equal to Max Latency Pictures [ Htid ].

TABLE 9-continued

- The number of pictures in the sub-DPB is greater than or equal to max_dec_pic_buffering_minus1[ Htid ] + 1.
- The number of pictures in the DPB is greater than or equal to OlsMaxDecPicBufferingMinus1[Htid] + 1.

For example, referring to Table 9, the number of pictures of the sub DPB may be greater than or equal to max_dec_pic_buffering_minus1[Htid]+1. Also, for example, the number of pictures in the DPB may be greater than or equal to OlsMaxDecPicBufferingMinus1[Htid]+1.

Also, according to the present embodiment, the constraint on the maximum picture of the DPB (i.e., the maximum number of pictures of the DPB) may be updated as follows. Here, the maximum number of pictures of the DPB may be represented as the maximum DPB size.

TABLE 10

When the specified level is not level 8.5, the value of OlsMaxDecPicBufferingMinus1[ Htid ] + 1 shall be less than or equal to MaxDpbSize,
which is derived as follows:
  if( PicSizeInSamplesY <= ( MaxLumaPs >> 2 ))
    MaxDpbSize = Min( 4 * maxDpbPicBuf, 16 )
  else if( PicSizeInSamplesY <= (MaxLumaPs >> 1))
    MaxDpbSize = Min( 2 * maxDpbPicBuf, 16 )    (A.1)
  else if( PicSizeInSamplesY <= (( 3 * MaxLumaPs ) >> 2 ))
    MaxDpbSize = Min( ( 4 * maxDpbPicBuf) / 3, 16 )
  else
    MaxDpbSize = maxDpbPicBuf
where MaxLumaPs is specified in Table A.1, and maxDpbPicBuf is equal to 8.

For example, referring to Table 10, when the level is not level 8.5, the value of OlsMaxDecPicBufferingMinus1[Htid]+1 may be less than or equal to MaxDpbSize.

Alternatively, as an embodiment, the signaled video parameter set (VPS) syntax may be as follows.

TABLE 11

| | Descriptor |
|---|---|
| video_parameter_set_rbsp( ) { | |
| ... | |
|   if( !vps_all_independent_layers_flag) | |
|     vps_num_dpb_params | ue(v) |
|   if( vps_num_dpb_params > 0 ) { | |
|     same_dpb_size_output_or_nonoutput_flag | u(1) |
|     if( vps_max_sublayers_minus1 > 0 ) | |
|       vps_sublayer_dpb_params_present_flag | u(1) |
|   } | |
|   for( i = 0; i < vps_num_dpb_params; i++ ) { | |
|     dpb_size_only_flag[ i ] | u(1) |
|     if( vps_max_sublayers_minus1 > 0 && !vps_all_layers_same_num_sublayers_flag ) | |
|       dpb_max_temporal_id[ i ] | u(3) |
|     dpb_parameters( dpb_size_only_flag[ i ], dpb_max_temporal_id[ i ], | |
|       vps_sublayer_dpb_params_present_flag) | |
|   } | |
|   for( i = 0; i < vps_max_layers_minus 1 && vps_num_dpb_params > 1; i++ ) | |
|   { | |
|     if( !vps_independent_layer_flag[ i ]) | |
|       layer_output_dpb_params_idx[ i ] | ue(v) |
|     if( LayerUsedAsRefLayerFlag[ i ] && !same_dpb_size_output_or_nonoutput_flag) | |
|       layer_nonoutput_dpb_params_idx[ i ] | ue(v) |
|   } | |
|   for( i = 0; i < TotalNumOlss && vpsnumdpbparams > 1; i++) | |
|     if(NumLayersInOls[ i ] > 1 ) { | |
|       vps_ols_dpb_params_present_flag[ i ] | u(1) |
|       if( vps_ols_dpb_params_present_flag[ i ]) | |
|         ols_dpb_params_idx[ i ] | ue(v) |
|     } | |
|   ... | |
| } | |

Referring to Table 11, the VPS may include syntax element vps_num_dpb_params, same_dpb_size_output_or_nonoutput_flag, vps_sublayer_dpb_params_present_flag, dpb_size_only_flag[i], dpb_max_temporal_id[i], layer_output_dpb_params_idx[i], and/or layer_nonoutput_dpb_params_idx[i].

In addition, referring to Table 11, the VPS may further include a syntax element vps_ols_dpb_params_present_flag and/or ols_dpb_params_idx[i].

For example, when i is less than TotalNumOlss, and when vps_num_dpb_params is greater than 1, and if NumLayersInOls[i] is greater than 1, then the syntax element vps_ols_dpb_params_present_flag may be signaled. Unlike in the embodiment shown in Table 7 above, in which vps_ols_dpb_params_present_flag is signaled without a separate condition, vps_ols_dpb_params_present_flag can be signaled only when i is less than TotalNumOlss and vps_num_dpb_params is greater than 1.

For example, the syntax element vps_ols_dpb_params_present_flag may indicate whether ols_dpb_params_idx[ ] may be present. For example, when the value of vps_ols_dpb_params_present_flag is 1, vps_ols_dpb_params_present_flag may indicate that ols_dpb_params_idx[ ] may be present, while, when the value of vps_ols_dpb_params_present_flag is 0, vps_ols_dpb_params_present_flag may indicate that ols_dpb_params_idx[ ] is not present. Meanwhile, when vps_ols_dpb_params_present_flag is not present, the value of vps_ols_dpb_params_present_flag may be inferred to be 0.

Also, for example, when vps_ols_dpb_params_present_flag is 1, a syntax element ols_dpb_params_idx[i] may be signaled.

For example, when NumLayersInOls[i] is greater than 1, the syntax element ols_dpb_params_idx[i] may specify the index of the dpb_parameters( ) syntax structure applied to the i-th OLS, in the list of dpb_parameters( ) syntax structure of the VPS. That is, for example, the syntax element ols_dpb_params_idx[i] may indicate the dpb_parameters( ) syntax structure of the VPS for the target OLS (i.e., the i-th OLS). When ols_dpb_params_idx[i] is present, the value of ols_dpb_params_idx[i] may be in the range of 0 to vps_num_dpb_params−1.

Figure 7:
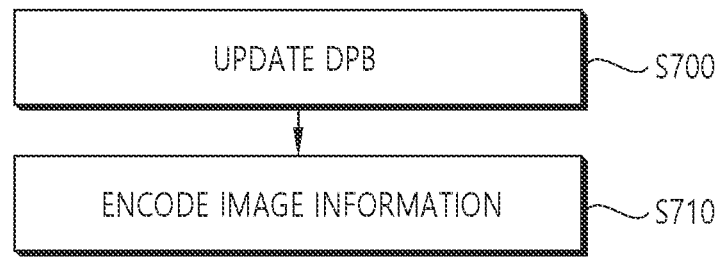
FIG. 7 briefly illustrates an image encoding method performed by an encoding apparatus according to the present disclosure.

FIG. 7 briefly illustrates an image encoding method performed by an encoding apparatus according to the present disclosure. The method disclosed in FIG. 7 may be performed by the encoding apparatus disclosed in FIG. 2. Specifically, for example, S700 in FIG. 7 may be performed by the DPB of the encoding apparatus, and S710 in FIG. 7 may be performed by the entropy encoder of the encoding apparatus.

The encoding apparatus updates a decoded picture buffer (DPB) (S700). For example, the encoding apparatus may update a decoded picture buffer (DPB). For example, the encoding apparatus may perform a picture management process for pictures of a DPB based on the DPB parameter information for the target OLS. For example, the encoding apparatus may generate and encode the DPB parameter information for the OLSs including the DPB parameter information of the target OLS. The image information may include the DPB parameter information for the OLSs. For example, a video parameter set (VPS) syntax may include the DPB parameter information for the OLSs.

For example, the DPB parameter information for the target OLS may include information on the DPB size for the target OLS, information on the maximum picture reorder number of the DBP for the target OLS, and/or information on the maximum latency of the DBP for the target OLS. Here, the DPB size may indicate the maximum number of pictures that the DPB can include.

The syntax element of the information on the DPB size for the target OLS may be the above-described max_dec_pic_buffering_minus1[i]; the syntax element of the information on the maximum picture reorder number of the DBP for the target OLS may be the above-described max_num_reorder_pics[i]; and the syntax element of the information on the maximum latency of the DBP for the target OLS may be the above-described max_latency_increase_plus1[i].

Meanwhile, for example, it may be determined whether the bumping process is performed on the picture in the DPB based on the number of pictures in the DPB and information on the DPB size for the target OLS. For example, when the number of pictures in the DPB is greater than or equal to the value derived based on the information on the DPB size, the bumping process may be performed, while, when the number of pictures in the DPB is less than the value derived based on the information on the DPB size, the bumping process may not be performed. Here, for example, the value derived based on the information on the DPB size may be a value obtained by adding 1 to the value of the information on the DPB size.

The encoding apparatus encodes the image information (S710). The encoding apparatus may encode the image information. For example, the image information may include the DPB parameter information for the OLSs, and an OLS DPB parameter index for the target OLS.

For example, the encoding apparatus may generate and encode the DPB parameter information for the OLSs including the DPB parameter information of the target OLS. The image information may include the DPB parameter information for the OLSs. For example, a video parameter set (VPS) syntax may include the DPB parameter information for the OLSs.

For example, the DPB parameter information for the target OLS may include information on the DPB size for the target OLS, information on the maximum picture reorder number of the DBP for the target OLS, and/or information on the maximum latency of the DBP for the target OLS. Here, the DPB size may indicate the maximum number of pictures that the DPB can include. The syntax element of the information on the DPB size for the target OLS may be the above-described max_dec_pic_buffering_minus1[i], the syntax element of the information on the maximum picture reorder number of the DBP for the target OLS may be the above-described max_num_reorder_pics[i], and the syntax element of the information on the maximum latency of the DBP for the target OLS may be the above-described max_latency_increase_plus1[i].

Additionally, for example, the encoding apparatus may generate and encode an OLS DPB parameter index for the DPB parameter information of the target OLS. The image information may include an OLS DPB parameter index for DPB parameter information of the target OLS. For example, the VPS syntax may include the OLS DPB parameter index.

For example, the OLS DPB parameter index for the target OLS may indicate DPB parameter information for the target OLS. For example, the OLS DPB parameter index for the target OLS may indicate DPB parameter information for the target OLS among the DPB parameter information for the OLSs. The syntax element of the OLS DPB parameter index may be the above-described vps_ols_dpb_params_idx[i] or ols_dpb_params_idx[i].

Meanwhile, for example, the encoding apparatus may generate and encode an OLS DPB parameter flag for whether the DPB parameter information for the OLSs is present. For example, the image information may include the OLS DPB parameter flag. Additionally, for example, the VPS syntax may include the OLS DPB parameter flag. For example, the OLS DPB parameter flag may indicate whether the DPB parameter information for the OLSs is present. For example, when the value of the OLS DPB parameter flag is 1, the OLS DPB parameter flag may indicate that the DPB parameter information for the OLSs may be present, while, when the value of the OLS DPB parameter flag is 0, the OLS DPB parameter flag may indicate that the DPB parameter information for the OLSs is not present. Also, for example, the OLS DPB parameter index may be generated and encoded based on the OLS DPB parameter flag. For example, when the value of the OLS DPB parameter flag is 1, the OLS DPB parameter index may be generated/encoded/signaled, while, when the value of the OLS DPB parameter flag is 0, the OLS DPB parameter index may not be generated/encoded/signaled. The syntax element of the OLS DPB parameter flag may be the above-described vps_ols_dpb_params_present_flag.

Meanwhile, for example, the encoding apparatus may encode prediction information and residual information for a block in the current picture.

For example, the encoding apparatus may determine whether to perform inter prediction or intra prediction on the block, and may determine a specific inter prediction mode or a specific intra prediction mode based on RD cost. According to the determined mode, the encoding apparatus may derive the prediction sample for the block. The prediction information may include prediction mode information for the block.

Also, the encoding apparatus may generate and encode a reference picture index indicating a reference picture for the block. For example, the prediction information may include the reference picture index. Also, the encoding apparatus may derive motion information for the block, and may generate and encode information on the motion information. For example, the prediction information may include the information on the motion information and the reference picture index.

Also, for example, the encoding apparatus may encode residual information for the block of the picture. For example, the encoding apparatus may derive the residual sample through the subtraction of the original sample and the prediction sample for the block.

Thereafter, for example, the encoding apparatus may derive a quantized residual sample by quantizing the residual sample, and may derive a transform coefficient based on the quantized residual sample, and may generate and encode the residual information based on the transform coefficient. Alternatively, for example, the encoding apparatus may derive a quantized residual sample by quantizing the residual sample, and may derive a transform coefficient by transforming the quantized residual sample, and may generate and encode the residual information based on the transform coefficient. The image information may include the residual information. Additionally, for example, the encoding apparatus may encode image information and output it in the form of a bitstream.

Meanwhile, although not shown in the drawings, the encoding apparatus may decode the current picture based on pictures of the DPB on which the picture management process has been performed. That is, the encoding apparatus may decode the current picture based on the pictures of the updated DPB. For example, the encoding apparatus may derive a prediction sample by performing inter prediction on a block in the current picture based on the reference picture of the updated DPB, and may generate a reconstructed sample and/or a reconstructed picture for the current picture based on the prediction sample. Meanwhile, for example, the encoding apparatus may derive a residual sample for a block in the current picture, and may generate a reconstructed sample and/or a reconstructed picture through addition of the prediction sample and the residual sample. Thereafter, as described above, the in-loop filtering process such as an ALF process, SAO and/or deblocking filtering may be applied as needed to the reconstructed samples in order to improve subjective/objective video quality.

Meanwhile, the bitstream including the image information may be transmitted to the decoding apparatus through a network or a (digital) storage medium. Here, the network may include a broadcast network, a communication network and/or the like, and the digital storage medium may include various storage media, such as USB, SD, CD, DVD, Blu-ray, HDD, SSD, and the like.

Figure 8:
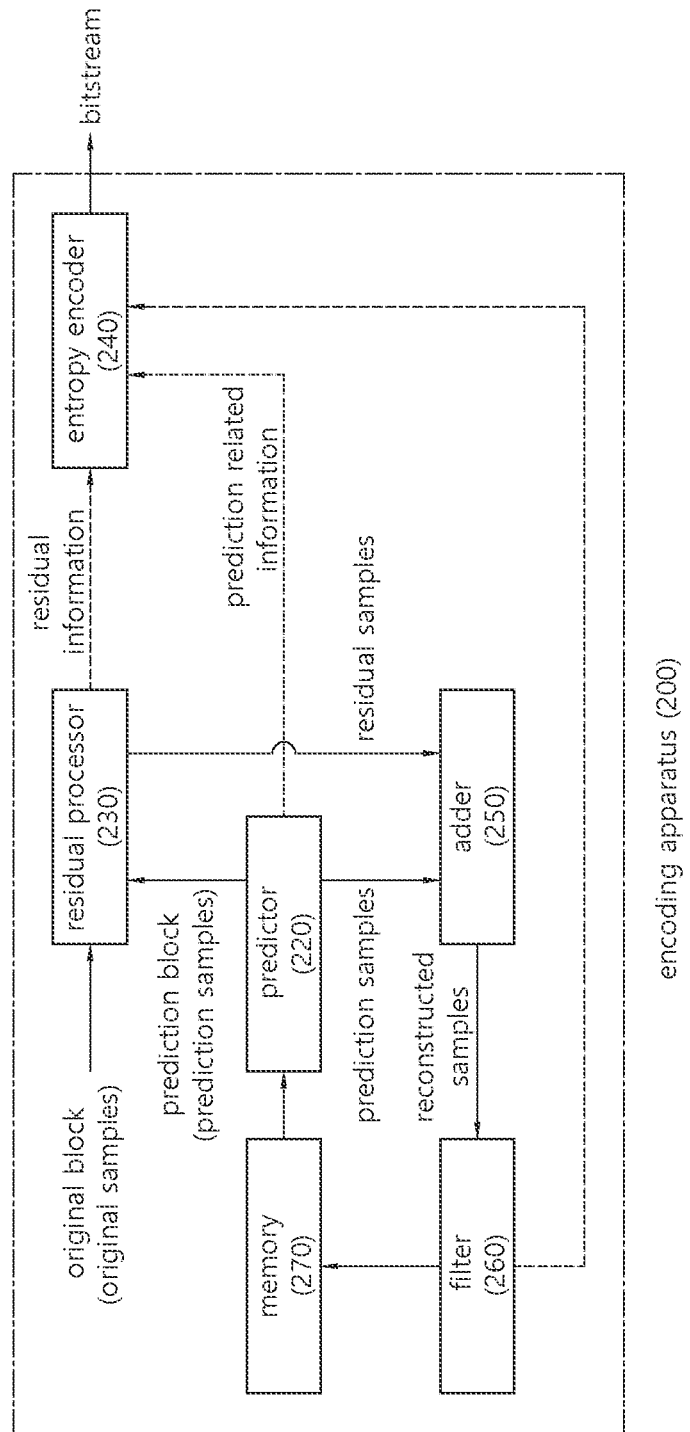
FIG. 8 briefly illustrates an encoding apparatus for performing an image encoding method according to the present disclosure.

FIG. 8 briefly illustrates an encoding apparatus for performing an image encoding method according to the present disclosure. The method disclosed in FIG. 7 may be performed by the encoding apparatus disclosed in FIG. 8. Specifically, for example, the DPB of the encoding apparatus of FIG. 8 may perform S700, and the entropy encoder of the encoding apparatus of FIG. 8 may perform S710.

Figure 9:
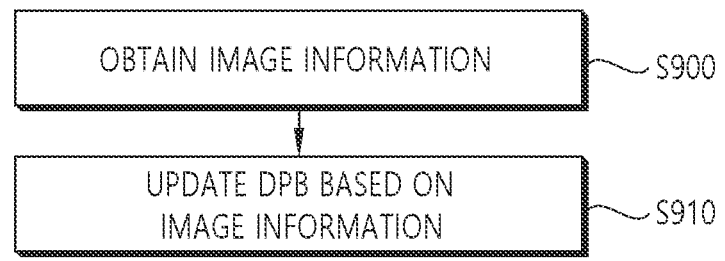
FIG. 9 briefly illustrates an image decoding method performed by a decoding apparatus according to the present disclosure.

FIG. 9 briefly illustrates an image decoding method performed by a decoding apparatus according to the present disclosure. The method disclosed in FIG. 9 may be performed by the decoding apparatus disclosed in FIG. 3. Specifically, for example, S900 in FIG. 9 may be performed by the entropy decoder of the decoding apparatus, and S910 in FIG. 9 may be performed by the DPB of the decoding apparatus.

The decoding apparatus obtains image information (S900). The decoding apparatus may obtain the image information from the bitstream. For example, the decoding apparatus may obtain an OLS DPB parameter index for a target output layer set (OLS), and may obtain DPB parameter information for the target OLS based on the OLS DPB parameter index.

For example, the decoding apparatus may obtain a video parameter set (VPS) syntax from the bitstream. The image information may include the VPS syntax. The image information may be received in a bitstream. The VPS syntax may include the OLS DPB parameter index for the target OLS. That is, for example, the decoding apparatus may obtain the OLS DPB parameter index for the target OLS using the VPS syntax.

For example, the OLS DPB parameter index for the target OLS may indicate DPB parameter information for the target OLS. Meanwhile, for example, the image information may include the DPB parameter information for the OLSs. The VPS syntax may include the DPB parameter information for the OLSs. That is, for example, the decoding apparatus may obtain the DPB parameter information for the OLSs using the VPS syntax. For example, the DPB parameter information for the OLSs may include DPB parameter information for the target OLS, and the OLS DPB parameter index for the target OLS may indicate DPB parameter information for the target OLS in the DPB parameter information for the OLSs. The syntax element of the OLS DPB parameter index may be the above-described vps_ols_dpb_params_idx[i] or ols_dpb_params_idx[i].

For example, the DPB parameter information for the target OLS may include information on the DPB size for the target OLS, information on the maximum picture reorder number of the DBP for the target OLS, and/or information on the maximum latency of the DBP for the target OLS. Here, the DPB size may indicate the maximum number of pictures that the DPB can include. The syntax element of the information on the DPB size for the target OLS may be the above-described max_dec_pic_buffering_minus1[i], the syntax element of the information on the maximum picture reorder number of the DBP for the target OLS may be the above-described max_num_reorder_pics[i], and the syntax element of the information on the maximum latency of the DBP for the target OLS may be the above-described max_latency_increase_plus1[i].

Meanwhile, for example, the decoding apparatus may obtain an OLS DPB parameter flag for whether DPB parameter information for OLSs is present. For example, the image information may include the OLS DPB parameter flag. Additionally, for example, the VPS syntax may include the OLS DPB parameter flag. For example, the OLS DPB parameter flag may indicate whether the DPB parameter information for the OLSs is present. For example, when the value of the OLS DPB parameter flag is 1, the OLS DPB parameter flag may indicate that the DPB parameter information for the OLSs may be present, while, when the value of the OLS DPB parameter flag is 0, the OLS DPB parameter flag may indicate that the DPB parameter information for the OLSs is not present. Also, for example, the OLS DPB parameter index may be obtained based on the OLS DPB parameter flag. For example, when the value of the OLS DPB parameter flag is 1, the OLS DPB parameter index may be signaled/obtained, while, when the value of the OLS DPB parameter flag is 0, the OLS DPB parameter index may not be signaled/obtained. The syntax element of the OLS DPB parameter flag may be the above-described vps_ols_dpb_params_present_flag.

The decoding apparatus updates a decoded picture buffer (DPB) based on the image information (S910). For example, the decoding apparatus may update a decoded picture buffer (DPB) based on the image information. For example, the update process may be performed based on DPB parameter information for a target OLS derived based on the OLS DPB parameter index.

For example, the decoding apparatus may derive DPB parameter information for the target OLS among the DPB parameter information for the OLSs based on the OLS DPB parameter index. For example, the decoding apparatus may derive DPB parameter information for the target OLS indicated by the OLS DPB parameter index among the DPB parameter information for the OLSs.

Also, for example, the decoding apparatus may update a decoded picture buffer (DPB) based on the DPB parameter information for the target OLS. That is, for example, the decoding apparatus may perform a picture management process for (decoded) pictures of the DPB based on the DPB parameter information for the target OLS. For example, the decoding apparatus may add a decoded picture to the DPB, or may remove a decoded picture in the DPB. For example, the decoded picture in the DPB may be used as a reference picture of inter prediction for the current picture, or the decoded picture in the DPB may be used as an output picture. The decoded picture may refer to a picture decoded before the current picture in decoding order in the target OLS.

For example, the decoding apparatus may determine whether a bumping process for the pictures in the DPB is performed based on information on the DPB size for the target OLS and the number of pictures in the DPB, and may perform the bumping process for the picture in the DPB based on the determination result. For example, when the number of pictures in the DPB is greater than or equal to the value derived based on the information on the DPB size, the bumping process may be performed, while, when the number of pictures in the DPB is less than the value derived based on the information on the DPB size, the bumping process may not be performed. Here, for example, the value derived based on the information on the DPB size may be a value obtained by adding 1 to the value of the information on the DPB size.

Meanwhile, the decoding apparatus may decode the current picture based on the DPB. For example, the decoding apparatus may decode the current picture based on the pictures of the updated DPB. For example, the decoding apparatus may derive a prediction sample by performing inter prediction on a block in the current picture based on the reference picture of the DPB, and may generate a reconstructed sample and/or a reconstructed picture for the current picture based on the prediction sample. Meanwhile, for example, the decoding apparatus may derive a residual sample for a block in the current picture based on residual information received through a bitstream, and may generate a reconstructed picture and/or a reconstructed sample through addition of the predicted sample and the residual sample.

Meanwhile, for example, the decoding apparatus may obtain the prediction information and the residual information for the block of the current picture. The image information may include the prediction information and the residual information. For example, the prediction information may include a reference picture index indicating a reference picture for the block. Also, for example, the prediction information may include information on motion information for the block.

Also, for example, the residual information may include information such as value information of (quantized) transform coefficients of the block, location information, a transform technique, a transform kernel, and a quantization parameter. Also, for example, the residual information may include a transform skip flag. The transform skip flag may indicate whether transform is applied to the block.

Thereafter, as described above, the in-loop filtering process such as an ALF process, SAO and/or deblocking filtering may be applied as needed to the reconstructed samples in order to improve subjective/objective video quality.

Figure 10:
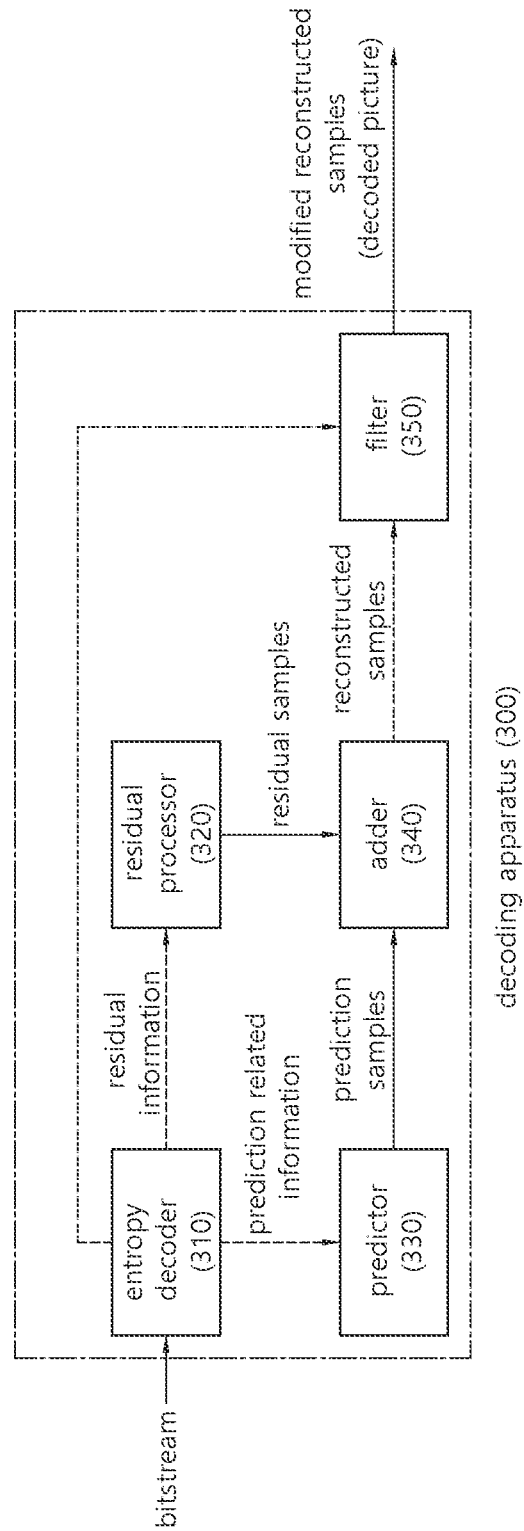
FIG. 10 briefly illustrates a decoding apparatus for performing an image decoding method according to the present disclosure.

FIG. 10 briefly illustrates a decoding apparatus for performing an image decoding method according to the present disclosure. The method disclosed in FIG. 9 may be performed by the decoding apparatus disclosed in FIG. 10. Specifically, for example, the entropy decoder of the decoding apparatus of FIG. 10 may perform S900 of FIG. 9, and the DPB of the decoding apparatus of FIG. 10 may perform S910 in FIG. 9.

According to this document described above, it is possible to signal the DPB parameter for the OLS, and through this, the DPB can be updated adaptively to the OLS, and overall coding efficiency can be improved.

In addition, according to this document, index information indicating the DPB parameter for the OLS can be signaled, and through this, the DPB parameter can be derived adaptively to the OLS, and the overall coding efficiency can be improved by updating the DPB for OLS based on the derived DPB parameter.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 11:
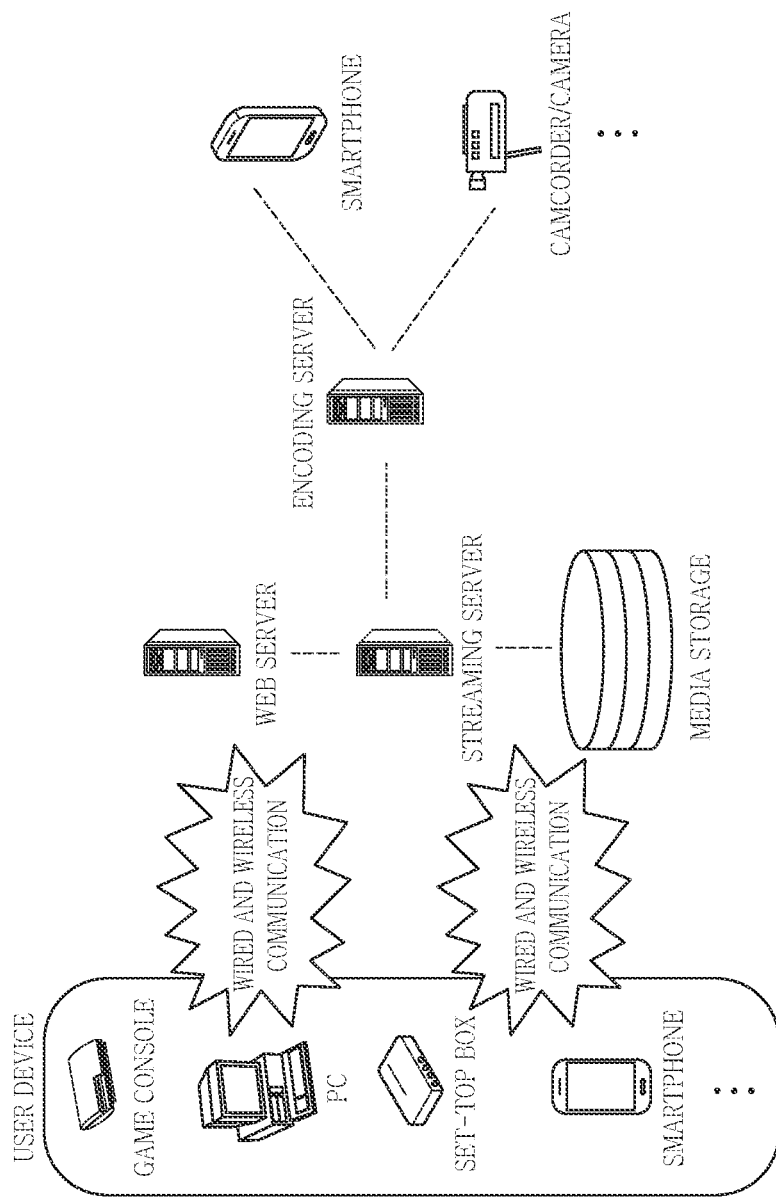
FIG. 11 illustrates a structural diagram of a contents streaming system to which the present disclosure is applied.

FIG. 11 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding method performed by a decoding apparatus, the method comprising:
obtaining image information; and
updating a decoded picture buffer (DPB) based on the image information,
wherein the obtaining the image information includes:
obtaining an output layer set (OLS) DPB parameter index for a target OLS; and
obtaining DPB parameter information for the target OLS based on the OLS DPB parameter index,
wherein the OLS DPB parameter index is obtained based on a number of the OLS.

2. The image decoding method of claim 1, wherein the DPB parameter information for the target OLS includes information on DPB size, information on maximum picture reorder number of the DPB for the target OLS, and information on maximum latency of the DPB.

3. The image decoding method of claim 1, wherein the DPB parameter information for the target OLS and the OLS DPB parameter index are included in a video parameter set (VPS) syntax.

4. An image encoding method performed by an encoding apparatus, the method comprising:
updating a decoded picture buffer (DPB); and
encoding image information,
wherein the encoding the image information includes:
encoding DPB parameter information for output layer sets (OLSs); and
encoding an OLS DPB parameter index for DPB parameter information for a target OLS among the DPB parameter information for the OLSs,
wherein the OLS DPB parameter index is encoded based on a number of the OLS.

5. The image encoding method of claim 4, wherein the DPB parameter information for the target OLS includes information on DPB size, information on maximum picture reorder number of the DPB for the target OLS, and information on maximum latency of the DPB.

6. The image encoding method of claim 4, wherein the DPB parameter information for the target OLS and the OLS DPB parameter index are included in a video parameter set (VPS) syntax.

7. A non-transitory computer-readable storage medium storing a bitstream generated by a method, the method comprising:
 updating a decoded picture buffer (DPB); and
 encoding image information,
 wherein the encoding the image information includes:
  encoding DPB parameter information for output layer sets (OLSs);
  encoding an OLS DPB parameter index for DPB parameter information for a target OLS among the DPB parameter information for the OLSs; and
 generating the bitstream including the OLS DPB parameter index and the DPB parameter information for the OLSs,
 wherein the OLS DPB parameter index is encoded based on a number of the OLS.

\* \* \* \* \*